(12) United States Patent
Sammon et al.

(10) Patent No.: US 7,263,179 B2
(45) Date of Patent: Aug. 28, 2007

(54) APPARATUS AND METHOD FOR IDENTIFICATION OF PERSON PLACING A PHONE CALL

(75) Inventors: Michael J. Sammon, Watchung, NJ (US); Doree Duncan Seligmann, New York, NY (US)

(73) Assignee: Avaya Technology Corp., Basking Ridge, NJ (US)

( * ) Notice: Subject to any disclaimer, the term of this patent is extended or adjusted under 35 U.S.C. 154(b) by 184 days.

(21) Appl. No.: 10/386,802

(22) Filed: Mar. 11, 2003

(65) Prior Publication Data
US 2004/0179660 A1 Sep. 16, 2004

(51) Int. Cl.
*H04M 1/64* (2006.01)
(52) U.S. Cl. ............................. 379/88.21; 379/142.04; 358/1.15; 370/493; 455/415

(58) Field of Classification Search ............. 379/88.19, 379/88.2, 88.21, 142.04, 142.06, 142.03, 379/114.2; 358/1.15; 370/493; 455/415
See application file for complete search history.

(56) References Cited

U.S. PATENT DOCUMENTS

| 5,729,592 | A * | 3/1998 | Frech et al. ............. 379/88.19 |
| 5,864,612 | A * | 1/1999 | Strauss et al. ......... 379/142.03 |
| 6,453,029 | B1 * | 9/2002 | Campbell ................. 379/114.2 |
| 6,771,755 | B1 * | 8/2004 | Simpson ................. 379/142.04 |
| 6,922,258 | B2 * | 7/2005 | Pineau ...................... 358/1.15 |
| 2003/0072330 | A1 * | 4/2003 | Yang et al. .................. 370/493 |

OTHER PUBLICATIONS

Overview for AVAYA 19600 Internet Protocol Communications Server, Release 10, Issue 1, Dec. 2001.

* cited by examiner

*Primary Examiner*—Gerald Gauthier

(57) ABSTRACT

The present invention relates to a telephone system in which the actual identity of the calling individual is provided to the called party. The calling individual has at least one identification code ("ID") associated with him. The invention then maps this unique ID to the actual identification of the calling party and substitutes the calling individual's number for the calling station number in the ANI identification provided to the telephone system.

16 Claims, 2 Drawing Sheets

APPARATUS AND METHOD FOR IDENTIFICATION OF PERSON PLACING A PHONE CALL

FIELD OF THE INVENTION

The present invention relates to an apparatus and method to indicate to the called party the identity of the individual who placed the call.

BACKGROUND OF THE INVENTION

"Caller identification" of the calling party is a well-known feature of a modern telephone system. However, in the prior art the called party is merely notified of the "identity" of the phone number that originated the call using automatic number identification (ANI). This phone number may not necessarily be associated with the person who is using the phone. That is, an individual may be calling from a colleague's office or a conference room. The called party will only learn of the phone number from which the phone call originated (hereinafter, the "calling station") and not the identity of the caller (hereinafter, the "calling individual").

It can readily be recognized that there are many situations in which it is advantageous that the actual identity of the calling individual be provided. Just one such example would be a cell phone user who routinely relegates to his mailbox almost all incoming calls—except those from certain individuals.

SUMMARY OF THE INVENTION

The present invention relates to a telephone system in which a phone user has at least one identification code ("ID") associated with him. This id can be manually entered, for example, via a telephone keypad or a computer keyboard. In a preferred embodiment the id is automatically entered into the system utilizing a wireless device carried or worn by the calling individual. The invention then maps this unique id to the actual identification of the calling party and substitutes the calling individual's number for the calling station number in the ANI identification provided to the telephone system.

DETAILED DESCRIPTION

Figure 1:
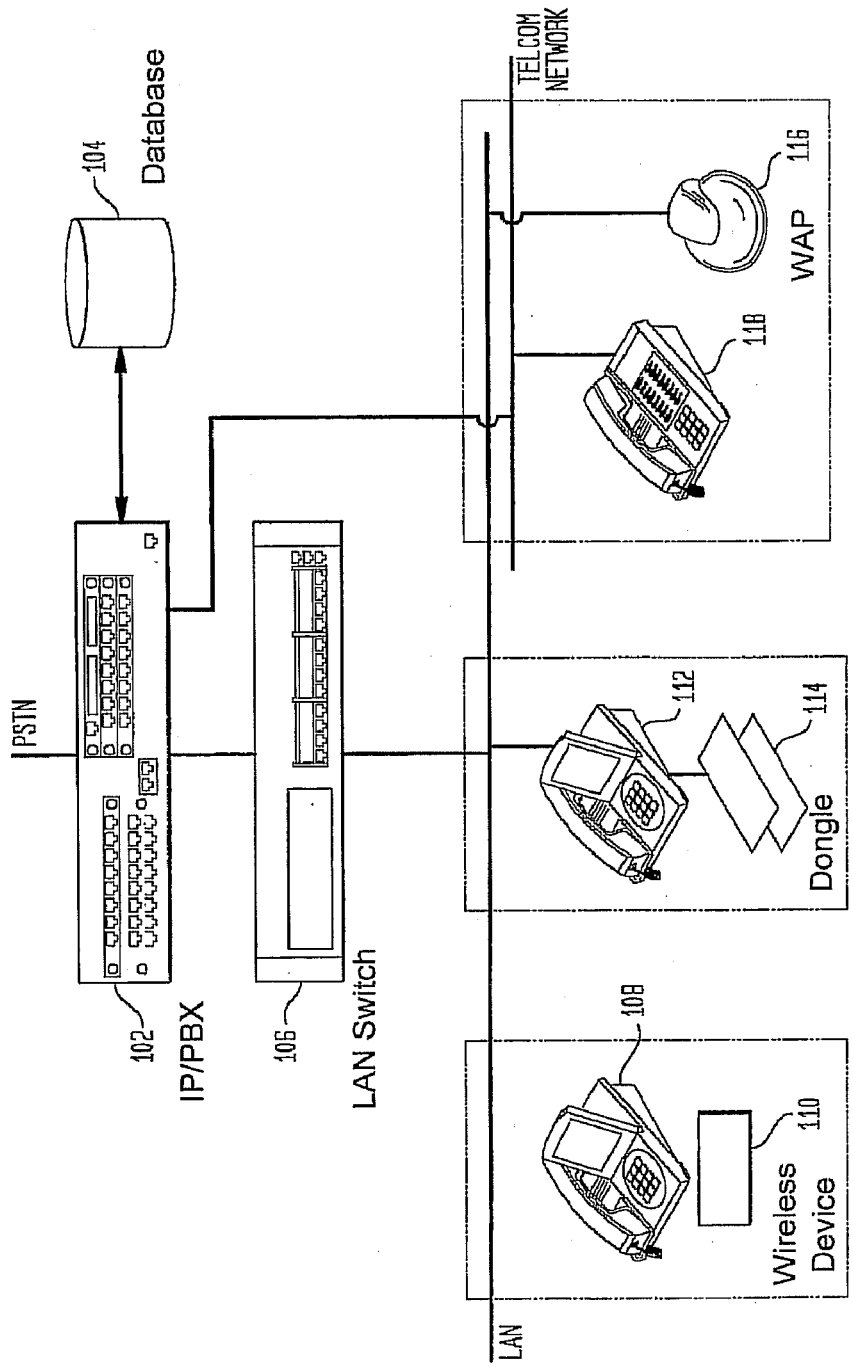
FIG. 1 is a block diagram depicted system architecture of one embodiment of the present invention.

FIG. 1 illustrates an embodiment of the invention wherein an IP-enabled PBX (IP-PBX) 102 provides access to the public switched telephone network (PSTN). Such PBX's, which can support packetized digital audio, are well known in the telephone industry. An example of such a PBX is an Avaya product marketed as the Avaya IP600 Internet Protocol Communications Server system. In the embodiment depicted in FIG. 1, a Local Area Network (LAN) switch 106 is illustrated. The LAN switch routes voice packets and efficiently permits delivery of voice over IP. For this reason such a LAN switch is typically provided in an IP-PBX system. However, and as will be further discussed below, a LAN switch is not required to implement the present invention.

FIG. 1 further depicts several phone instruments connected to the local LAN. In particular, Internet protocol (IP) phones 108 and 112 are illustrated. Phone 108 is depicted as being associated with an integrated wireless device 110. Phone 112 is illustrated with a wireless dongle. Further depicted in FIG. 1 is a wireless access point 116 physically co-located with a phone instrument 18 (analog phone or digital communications protocol). The system is not limited to these examples as the invention is intended to encompass all wireless technologies. In particular any manner of wireless access point that is capable of receiving presence messages from wireless communication devices is contemplated by the invention.

These embodiments of the invention require that the integrated wireless device 110 supply a unique identification code that is associated with the calling individual. Examples of such well-known devices, which can be readily worn or carried by the calling individual, are bluetooth transceivers and radio frequency (RF) tags. Thus, for example, a calling party having on his or her person a personal digital assistant (PDA) or a digital camera having a bluetooth transceiver would be so identified to the system at the time he places a call through the IP-PBX 102.

The unique identification code is communicated from the wireless access point to the IP-PBX 102. By accessing a database 104 containing a conversion table, the system would then convert the supplied identification code to the calling party's telephone number. This telephone number is then supplied to the public switched telephone network as if it had been supplied by a conventional ANI system. In this manner the called party would then be supplied the identity of the calling individual irrespective of where the he originated his phone call.

Figure 2:
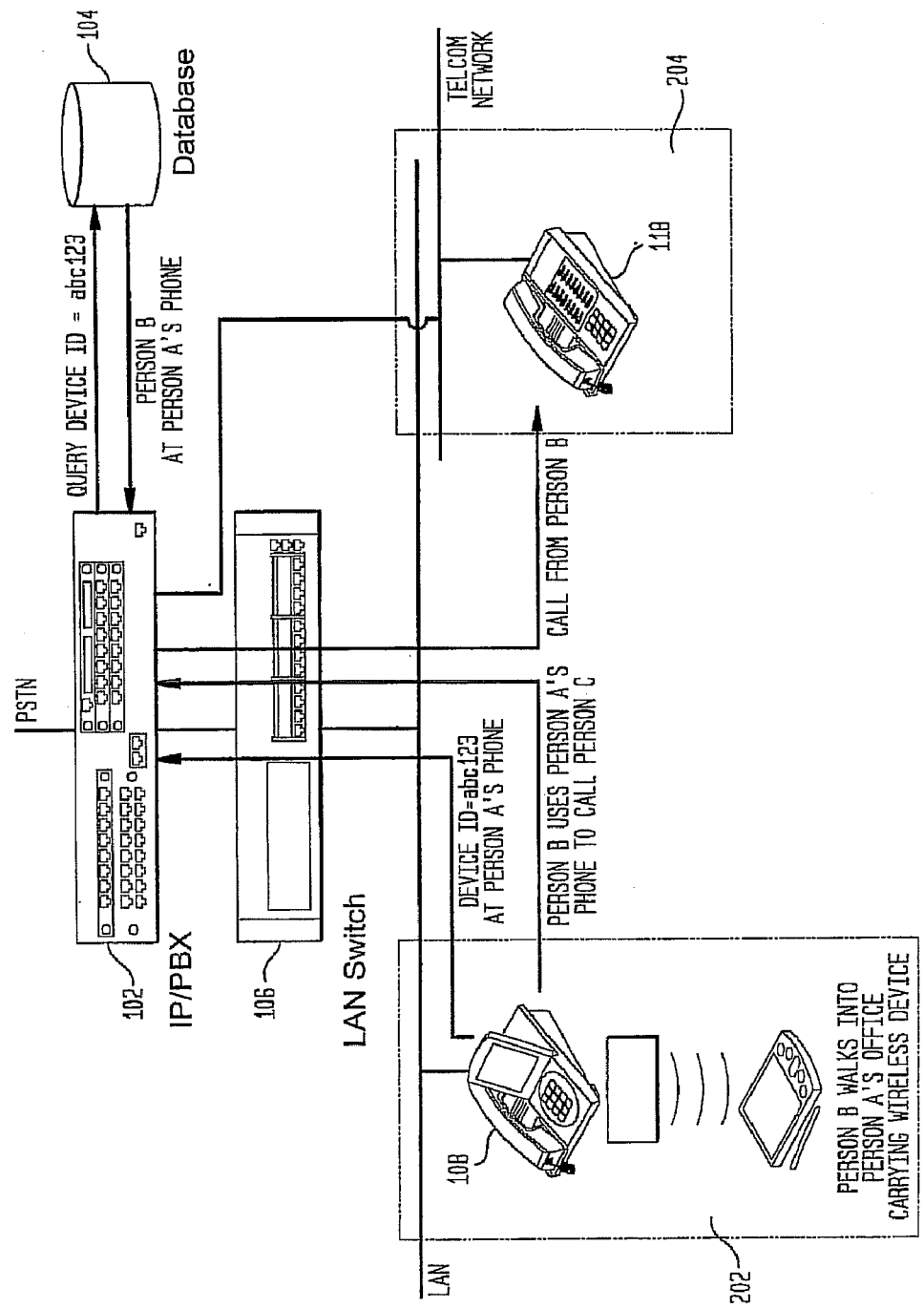
FIG. 2 is an illustrative example of a call being placed on the system depicted in FIG. 1.

FIG. 2 illustrates a call taking place on the embodiment of the invention depicted in FIG. 1. In particular Person B uses the phone instrument 108 in Person A's office 202 to call Person C's office 204. The wireless device 110 that person B carries communicates to the IP phone 108 a device ID ("abc123") that is unique to person B. This ID is communicated to the IP-PBX 102 which accesses database 104 to perform a mapping of the ID=abc123 to the identification of Person B as being the individual actually making the call at Person A's office. This identification of Person B is then communicated by the IP-PBX 102 to the phone instrument 108 located in Person C's office. Where, as is depicted here, the call is being handled internally, the identification of the calling party may include his name as well as his normal phone number. By way of comparison, had this been a call to an individual outside of the local PBX area, the identification of Person B would have been his or her normal phone number that would be supplied over the PSTN network as the "ANI" of the calling party. This new ANI could then be used as input for Caller ID services that are commonly provided by long distance and local telephone companies.

One difficulty that may be encountered by the system is the presence of more than one ID code. That is, extending the above example, both person B and person A are in person A's office when person B places the call and both individuals have wireless devices providing ID codes to the system. It is envisioned that the system could compare the relative strengths of the received signals and use the stronger one as that ID of the calling individual (as he would normally be closer to the phone instrument). Alternatively, the system could default to the ID of the person who owns the phone (Person A).

A further embodiment would permit clarification of any ambiguity of the identity of the calling individual by prompting the caller to verbally or manually make an entry to the system. By way of example, the preliminary identification of the calling individual would be displayed on the calling station phone. The user would then be prompted to make an entry such as a manual entry of a "1" on the phone touchtone pad or verbally saying "yes" to thereby confirm the preliminary identification of the individual to the system. As an additional example, the system may display a numbered list of all identified individuals in Person A's office (or in a conference room) and ask the user to manually or verbally select the actual calling individual by entering or saying the appropriate number from the list.

It is to be understood that the foregoing disclosure taught and described herein is illustrative of the present invention. Modifications may readily be devised by those ordinarily skilled in the art without departing from the spirit or scope of the present invention.

What is claimed is:

1. A method of providing to a called party the identification of a calling individual of a call originated at a calling station on a telephone system comprising an Internet Protocol PBX (IP-PBX) connected to a public switched telephone network (PSTN), said method comprising the steps of:
    acquiring at least one identification code (ID) associated with the calling individual wherein the calling individual is not associated with calling station by the telephone system;
    utilizing a database associated with said IP-PBX to determine the identification of the calling individual from said at least one ID; and
    providing the identification of the calling individual to the called party,
    wherein said step of acquiring at least one ID comprises the step of detecting, at the calling station, an ID automatically generated by a wireless device carried or worn by the calling individual and that identifies the calling individual.

2. The method of claim 1, wherein said wireless device is one of a bluetooth transceiver and a radio frequency (RF) tag.

3. The method of claim 1, wherein said identification of the calling individual comprises the calling individual's regular phone number.

4. The method of claim 3, wherein said step of providing the identification of the calling individual comprises the IP-PBX submitting the calling individual's regular phone number to the PSTN as the automatic number identification (ANI).

5. The method of claim 1, wherein said acquiring step further comprises acquiring one or more ID codes that are not associated with the calling individual, and wherein said utilizing step further comprises determining relative signal strengths of all acquired ID codes and prompting the calling individual to identify himself.

6. The method of claim 1, wherein said acquiring step further comprises acquiring a plurality of ID codes corresponding to a plurality of wireless devices carried by different persons, and wherein said utilizing step further comprises determining relative signal strengths of all acquired ID codes and using the ID that has the strongest signal strength to determine the identification of the calling individual.

7. The method of claim 1, wherein detecting the ID automatically generated by the wireless device carried or worn by the calling individual and that identifies the calling individual comprises receiving the ID at the calling station.

8. A system for providing to a called party an identity of a calling individual of a call originated at a calling station on a telephone system comprising an Internet Protocol PBX (IP-PBX) connected to a public switched telephone network (PSTN), said system comprising:
    an acquiring means for acquiring at least one identification code (ID) associated with the calling individual, wherein the calling individual is not associated with the calling station by the telephone system;
    a database, associated with said IP-PBX, containing a mapping of said at least one ID code to the identity of the calling individual; and
    a providing means for providing the identity of the calling individual to the called party,
    wherein said acquiring means comprises at least one wireless access point configured to detect, at the calling station, an ID automatically generated by a wireless device carried or worn by the calling individual and that identifies the calling individual.

9. The system of claim 8, wherein the wireless communication device is one of a bluetooth transceiver and a radio frequency (RF) tag.

10. The system of claim 8, wherein the wireless access point is selected from the group of wireless access points consisting of access points integrated into a phone instrument, access points attached to a terminal set as a dongle, and access points connected into a LAN wall jack.

11. The system of claim 8, wherein said providing means comprises the IP-PBX supplying the calling individual's regular phone number to the PSTN as the automatic number identification (ANI).

12. The system of claim 8, wherein said acquiring means further comprises acquiring one or more ID codes that are not associated with the calling individual, and wherein said providing means further comprises determining relative signal strengths of all acquired ID codes and prompting the calling individual to identify himself.

13. The system of claim 8, wherein said acquiring means further comprises acquiring a plurality of ID codes corresponding to a plurality of wireless devices carried by different persons, and wherein said providing means further comprises determining relative signal strengths of all acquired ID codes and using the ID that has the strongest signal strength to determine the identity of the calling individual.

14. A method of providing to a called party the identification of a calling individual of a call originated at a calling station on a telephone system comprising an Internet Protocol PBX (IP-PBX) connected to a public switched telephone network (PSTN), said method comprising:
    acquiring, at the calling station, an identification code (ID) associated with a first individual and an identification code (ID) associated with a second individual, wherein the identification codes are automatically generated by a wireless communication device carried or worn by each of the first and second individuals that identifies the first and second individuals, wherein at least the first individual is not previously associated with the calling station;

comparing relative signal strengths of the ID codes to determine the ID code having the strongest signal strength;

utilizing a database associated with the IP-PBX to determine the identification of the calling individual from the ID code having the strongest signal strength; and providing the identification of the calling individual to the called party.

15. The method according to claim 14, wherein providing the identification of the calling individual comprises the IP-PBX submitting the calling individual's regular phone number to the PSTN as the automatic number identification (ANI) for the calling station.

16. The method according to claim 14, wherein at least one of the wireless communication devices is a bluetooth transceiver or a radio frequency (RE) tag.

* * * * *